US006249773B1

(12) United States Patent
Allard et al.

(10) Patent No.: US 6,249,773 B1
(45) Date of Patent: *Jun. 19, 2001

(54) ELECTRONIC COMMERCE WITH SHOPPING LIST BUILDER

(75) Inventors: David J. Allard, Boynton Beach; Keith N. Fortenberry, Boca Raton, both of FL (US); Brad J. Konopik, Austin, TX (US); Robert M. Szabo; James J. Toohey, both of Boca Raton, FL (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/048,520

(22) Filed: Mar. 26, 1998

(51) Int. Cl.⁷ .................................................. G06F 17/60
(52) U.S. Cl. .................................................. 705/26
(58) Field of Search ............................ 705/26, 27, 1, 705/10

(56) References Cited

U.S. PATENT DOCUMENTS

| | | | | |
|---|---|---|---|---|
| 5,664,110 | * | 9/1997 | Green et al. | 705/26 |
| 5,691,864 | * | 11/1997 | Murrah | 235/385 |
| 5,715,314 | * | 2/1998 | Payne et al. | 380/24 |
| 5,745,681 | * | 4/1998 | Levine et al. | 709/200 |
| 5,758,095 | * | 5/1998 | Albaum et al. | 705/2 |
| 5,845,263 | * | 12/1998 | Camaisa et al. | 705/27 |
| 5,848,399 | * | 12/1998 | Burke | 705/27 |
| 5,897,622 | * | 4/1999 | Blinn et al. | 705/26 |
| 6,014,634 | * | 1/2000 | Scroggie et al. | 705/14 |
| 6,029,139 | * | 2/2000 | Cunningham et al. | 705/10 |

FOREIGN PATENT DOCUMENTS

10021304A * 1/1998 (JP).

OTHER PUBLICATIONS

Anon., "IT Network Kroger: Kroger Teams with Interactive Channel and Shoppers Express to Provide the fFrst Interactive Television Supermarket," Business Wire, Apr. 12, 1995.*

Zimmerman, D., "Tops Testing Comparison Shopping via the Internet," Supermarket News, vol. 46, No. 13, p. 13+, Mar. 25, 1996.*

Java Electronic Commerce Framework, Computer Reseller News, Sep. 23, 1996.*

* cited by examiner

Primary Examiner—Vincent Millin
Assistant Examiner—Nicholas David Rosen
(74) Attorney, Agent, or Firm—Akerman Senterfitt

(57) ABSTRACT

A method for engaging in electronic commerce (e-commerce) over a network from an e-commerce site, comprises the steps of: storing data representing an inventory of items for sale at the e-commerce site; storing historic and active shopping lists of respective shoppers at the e-commerce site; providing logged on shoppers with a shopping list builder tool for constructing entirely new shopping lists and for constructing new shopping lists from said stored shopping lists; accepting completed active shopping lists from the logged on shoppers; consummating purchases of products on the accepted lists; and, delivering the purchased products to the shoppers. The method can further comprise the step of: storing authorization data enabling shoppers to purchase the items at the e-commerce site on credit. Shoppers can use the shopping list builder to create, modify, delete and merge named lists. A permanent cumulative shopping list can be compiled for each shopper.

28 Claims, 3 Drawing Sheets

ELECTRONIC COMMERCE WITH SHOPPING LIST BUILDER

BACKGROUND OF THE INVENTION

1. Field of the Invention

This invention relates to the field of shopping over computer networks, for example a local area network (LAN), a wide area network (WAN), the Internet and the World Wide Web (WWW), and any combination thereof. In particular, the invention relates to the field of tools for building, modifying, maintaining and accessing shopping lists for shopping over computer networks.

2. Description of Related Art

The Internet is increasingly being exploited as a means to reach consumers directly. For example, purchasing consumable items from an electronic grocery or retail outlet is a business beginning to take form on the Internet. However, current practice has identified several contributing factors acting as barriers to wide acceptance of this new marketing channel. First, shopping in a grocery store will occur one or more times a week. Second, the typical inventory is on the order of tens of thousands of products, many of which are sold in several different sizes. Thirdly, consumers selecting to use such a service are doing so in the hope of saving time.

However, shopping for a hundred or so items out of an inventory of thousands or tens of thousands of items in an electronic shopping service is thus far a very tedious task for consumers. This task becomes worse when the service is utilized several times a month. Such a service can relate to many different situations too numerous to mention. A good example at the retail level is replenishing consumable and perishable items like groceries from a supermarket. A good example on the wholesale level is a building contractor purchasing building supplies.

The IBM Net.Commerce application and several other implemented shopping services utilize the notion of an electronic shopping cart. The inventory of the store is presented in a text list or in graphical form, perhaps through images of the stacked shelves in the store, by an Internet network. Items are placed into the shopping cart, for example by selecting a text item or by moving a product icon from a shelf into an electronic shopping cart by manipulating a computer pointer such as a mouse. Items in the cart can be reviewed and removed, that is deleted, prior to ordering.

Simple shopping carts do not address the problems associated with searching the store and selecting the items. This process can be both time consuming and unproductive in the sense that the consumer may not be able to find what they are looking for even though the store may offer the item in their inventory. Moreover, many purchases are repurchases of the same items over and over, for example milk, juice, cereal, eggs and bread in the context of grocery shopping. Notwithstanding the need for repetitive purchases, it is usually necessary to start with an empty shopping cart.

Other services offered by Peapod (www.peapod.com), Streamline, Hannaford (www.hannaford.com), PCFoods (pcfoods.com), Pinkdot (www.pinkdot.com), and Wal-Mart (www.wal-mart.com), for example, also exhibit the shortcomings noted above.

There is a pressing need to simplify many aspects of electronic shopping. One such aspect is that of inventories that are unmanageably large, from the viewpoint of a consumer perusing a vast number of items. A second such aspect is that of simplifying the repetitive purchase of consumable and perishable items, without always having to start with the equivalent of an empty shopping cart. A third such aspect is simplifying the computer operating tasks which must be undertaken to implement the electronic shopping. Overall, there is a pressing need to find a method or tool which enables consumers to save significant amounts of time by utilizing electronic shopping.

SUMMARY OF INVENTION

The invention taught herein satisfies the pressing need to simplify electronic shopping. In its broadest sense, the invention is a client/server tool that manages an individualized selection of product offerings, referred to as a "shopping list". The shopping list tool comprises several components, which enable consumers to peruse inventories that are otherwise unmanageably large, which simplify the repetitive purchase of consumable and perishable items and which simplify the computer operating tasks associated with electronic shopping. Overall, the new shopping list tool enables consumers to save significant amounts of time by shopping electronically, referred to herein as electronic commerce (e-commerce), at an e-commerce site. E-commerce can be conducted over computer networks, for example, the Internet, WANS, LANs and private dial-in access connections.

More particularly, the shopping list tool comprises: a consumer preferred user interface; a database for historical purchase data and inventory data; a product sorting method; a product searching method; and, a product selecting method.

Together these components enable a consumer to efficiently find and select items for purchase much as they would do at home by building a shopping list. In a particularly advantageous embodiment, the shopping list tool not only operates efficiently against a large inventory, but provides a customized reduced inventory in the form of previous named shopping lists to use as a starting point, or indeed, to use exactly as recalled.

A method for engaging in electronic commerce (e-commerce) over a network from an e-commerce site, in accordance with an inventive arrangement, comprises the steps of: storing data representing an inventory of items for sale at the e-commerce site; storing historic and active shopping lists of respective shoppers at the e-commerce site; providing logged on shoppers with a shopping list builder tool for constructing entirely new shopping lists and for constructing new shopping lists from the stored shopping lists; accepting completed active shopping lists from the logged on shoppers; consummating purchases of products on the accepted lists; and, delivering the purchased products to the shoppers.

The method can further comprise the steps of: storing authorization data enabling shoppers to purchase the items at the e-commerce site on credit; and, authorizing shoppers to purchase the items as the shoppers log on to the e-commerce site.

The method can further comprise the step of communicating with the shoppers over one or more of the Internet, a wide area network and a local area network.

The method can further comprise the step of delivering the purchased products to the shoppers at a pickup location or delivering the purchased products to the shoppers at locations selected by the shoppers.

The method can further comprise the step of enabling the shoppers to use the shopping list builder to create, merge, modify an/or delete the named lists.

The method can further comprise the step of enabling the shoppers to use the shopping list builder to search the inventory data base for specific products by brand name, product type, cost and on-sale status.

The method can further comprise the steps of: compiling a cumulative shopping list for each shopper; enabling each shopper to access each shopper's own cumulative shopping list; and, preventing shoppers from deleting and modifying the cumulative shopping lists.

The method can advantageously further comprise the steps of: displaying lists of product specials, for example unadvertised sale items; and, enabling the shoppers to select the product specials for addition to a shopping list in progress, for addition to a virtual shopping cart, or both.

A computer server programmed with a routine set of instructions for supporting electronic commerce (e-commerce) over a network from an e-commerce site, in accordance with another inventive arrangement, comprises: means for storing data representing an inventory of items for sale at the e-commerce site; means for storing historic and active shopping lists of respective shoppers at the e-commerce site; means for providing logged on shoppers with a shopping list builder tool for constructing entirely new shopping lists and for constructing new shopping lists from the stored shopping lists; means for accepting completed active shopping lists from the logged on shoppers; means for consummating purchases of products on the accepted lists; and, means for delivering the purchased products to the shoppers.

The computer server can further comprise: means for storing authorization data enabling shoppers to purchase the items at the e-commerce site on credit; and, means for authorizing shoppers to purchase the items as the shoppers log on to the e-commerce site.

The computer server can further comprise: means for compiling a cumulative shopping list for each shopper; means for enabling each shopper to access each shopper's own cumulative shopping list; and, means for preventing shoppers from deleting and modifying the cumulative shopping lists.

The shopping list builder can comprise means for enabling the shoppers to use the shopping list builder to create, merge, modify and delete the named lists.

The computer server can further comprise means for enabling the shoppers to use the shopping list builder to search the inventory data base for specific products by brand name, product type, cost and on-sale status.

The computer server can further comprise means for communicating with the shoppers over one or more of the Internet, a wide area network and a local area network.

The computer server can advantageously further comprise: means for displaying lists of product specials, for example unadvertised specials; and, means for enabling the shoppers to select the product specials for addition to a shopping list in progress, for addition to a virtual shopping cart, or both.

DETAILED DESCRIPTION OF THE PREFERRED EMBODIMENTS

Figure 1:
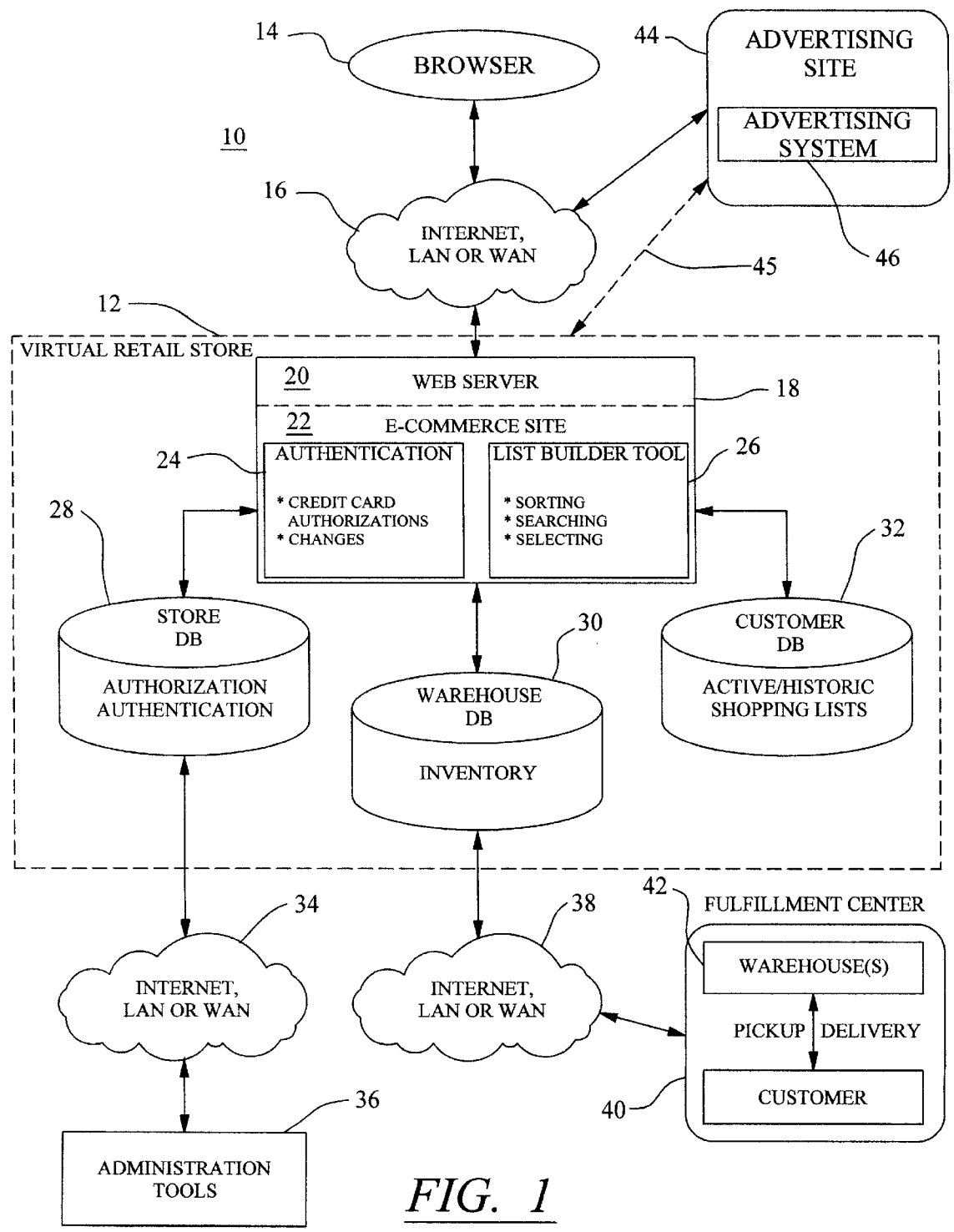
FIG. 1 is a block diagram of an arrangement for conducting electronic commerce in accordance with the inventive arrangements.

An arrangement 10 for conducting e-commerce at an e-commerce site is shown in FIG. 1. A virtual retail store, for example, is designated by reference numeral 12 and comprises a computer network 18, embodied for example in a single computer, a LAN, a WAN or a dial-in access connection. The network 18 comprises a web server 20, an e-commerce site 22 and several data bases. Store data base 28 includes authorization and authentication data. Warehouse data base 30 contains inventory data. Customer data base 32 advantageously contains active and historic shopping lists of shoppers.

Shoppers can access the virtual retail store by using a browser tool 14 which communicates with the virtual retail store over a network 16, for example the Internet, a WAN, a LAN or some combination thereof. The network 16 communicates with the web server 20.

Authorization and authentication data can be communicated between an administration tools site 36 and the store data base 28 over a network 34, for example the Internet, a WAN, a LAN or some combination thereof.

Data for filling orders can be communicated between a fulfillment center 40 and the warehouse data base 30 over a network 38, for example the Internet, a WAN, a LAN or some combination thereof. The fulfillment center represents one or more warehouses 42, which may or may not be in the same building as the e-commerce site or a real retail store. The fulfillment center arranges for purchased items to be picked up by the shoppers or to be delivered to the shoppers, depending upon the nature of the products and the nature of the retail business.

An advertising site 44 having an advertising system 46 for advertising goods and services available at the e-commerce site can operate independently of the e-commerce site as shown, or can be a part of the e-commerce site as shown by the dashed line 45.

It will be appreciated that the boundary of the virtual retail store as shown in the drawing by the dashed line box is somewhat arbitrary, in view of the ability to communicate data over networks, phone lines and the like. The warehouse data base 30, as just one example, can be located in or be part of the fulfillment center 40, in which case network 38 would enable communications between the fulfillment center 40 and the e-commerce site 22.

Items in a virtual retail store are browsed and selected as a shopper searches through the store. The store, which is itself a representation of the total inventory of products which can be purchased at a given network address, can be represented graphically or textually, or both. The nature of graphical images will depend upon the nature of the products. In an electronic grocery store or pharmacy or many other retail stores, the graphical images can represent aisles of shelves with products placed thereon. The shopping list, in this case, can be represented initially by an image of a shopping cart into which items are placed. One of each item will suffice, although different sizes of the same item can also be displayed. In a graphical milieu, the consumer can use a mouse or other pointing tool to copy and drag icons of the items from the shelves to the shopping cart. This manner of shopping is tedious at best, but there will be instances where a shopper will want to see an item before purchasing the item, or where the shopper may wish to actually see two or more items side by side. Tissues, for example, come in boxes which have different decorative patterns and colors, even when the tissues are identical from box to box. In accordance with the inventive arrangements, a textual milieu provides the shopper with lists and nested lists of products which can be easily searched by different criteria, and from which selections can easily be made. These criteria can include product type, brand name, cost and on-sale status. Direct searches for specific products and/or brands and/or prices and/or on-sale status are also provided. A shopper, for example, may want to purchase a certain item only if that item is on sale. An appropriate search is available. The electronic store can provide both kinds of interfaces, and in this instance, the shopper can preferably switch back and forth between the two interfaces as may be more convenient for different kinds of products. Moreover, the shopper's previous shopping lists are available for reference, and can be used as a starting point. This advantageously enables a shopper to start with a shopping list which, in many instances, will be very nearly complete, in the context of a weekly grocery list. The same can be said of a building contractor, who will need to purchase the same kinds of lumber, wallboard, fixtures, fasteners and other building materials for each house under construction.

Inasmuch as the electronic shopping can be, and indeed, is preferably tied in with the computer records of the store's product in-stock inventory, items which are sold out can automatically be deleted from the graphical representation and the text lists until the inventory is restocked or resupplied.

When items are finally taken to the checkout, figuratively speaking, and purchased, a record of the items purchased is added to the customer's profile with a visit time stamp. Purchased items can be tracked by their SKU (stock keeping unit), UPC (universal product code), retailer code, or a similar identifier. After purchase, arrangements can be made for delivery of the items, either to a specific site or address, or to a pickup facility in a warehouse. As with the historical shopping lists, delivery data can be stored and accessed to speed delivery arrangements as well.

The shopping list builder tool advantageously comprises: a consumer preferred user interface; a database for the consumer profiles and store inventory data; a sorting method; a searching method; and, a selection method. Advantageously, each of these constituent parts of the list tool builder works seamlessly with the other parts and with the e-commerce site, whether the list tool builder is utilized over the Internet, a WAN or a LAN, or some combination thereof. The shopping list tool builder advantageously provides logged on shoppers with a single tool for constructing entirely new shopping lists, that is created from scratch, and for constructing new shopping lists from stored, that is historical, shopping lists;

The consumer will have both graphical and textual means to locate items for purchase. The graphical interface provides a familiar visual navigation aid or metaphor for search and selection. In a grocery store, such an aid can be a grocery store cart which can be moved up and down aisles of foods and other products sold in such stores. Consumer defined help levels are available to guide the consumer. The basic selection object is referred to herein as a pick list. The consumer tags items on the list for inclusion into their virtual shopping cart.

The consumer profile will contain, but is not limited to, historical purchase data, personal information, charge authorization data and the like.

Pick lists can be sorted by type, date, category, sub-category and description as well as other criteria that may be particularly suited for the kinds of goods or services offered by the e-commerce site. In this manner, a pick list can be tailored to the specific needs and style of the individual consumer. A pick list can also be tailored to the specific needs and style of the picking facility.

The searching method combines multiple search strategies based on the context. For example, clicking on the sub-category of a particular item will issue a sub-category search seeded with the sub-category name clicked on by the consumer. The facility to issue an arbitrary search type and also argument is provided. Searching can be based on, but is not limited to item category, item sub-category, item brand, item manufacturer, and item description. In all cases, the results are returned as a pick list.

Selection is based on the pick list returned by a search. Consumers copy items they wish to purchase from a pick list to their shopping cart. Lists can be easily modified at any time. For example, items may be deleted, added, and modified directly off a pick list. The shopping cart is itself a representation of a pick list.

The value of the tool comes from the unique combination of all these parts, which allows the user to complete all stages of the shopping experience without having to use another tool.

Figure 2:
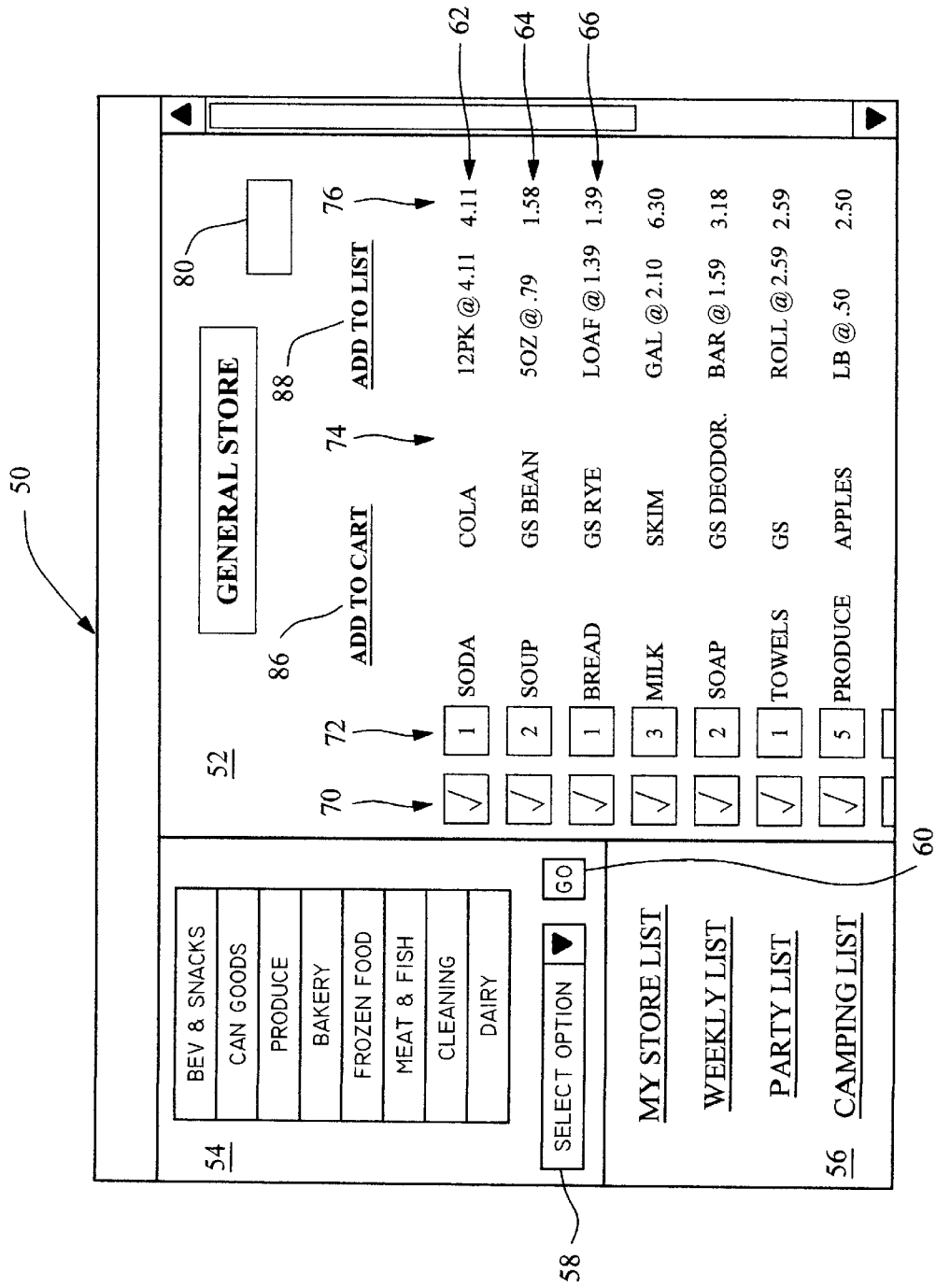
FIG. 2 is an exemplary graphical user interface useful for explaining the organization of the customer data base and the nature of the sorting, searching and selecting aspects of the list builder tool in accordance with the inventive arrangements.

A more detailed explanation of the list builder tool and the interaction of the list builder tool 26 with the shoppers and the e-commerce site, as well as the organization of the data bases 28, 30 and 32, can better be appreciated with reference to the graphical user interface (GUI) 50 shown in FIG. 2.

GUI 50 illustrates the manner in which data is presented to and manipulated by the shoppers as the shoppers utilize the tool to build a shopping list. The example is directed to groceries, but it should be appreciated that any inventory of items can be similarly represented. In accordance with general practice, user activatable functions are presented in pull down menus, in icons of buttons or pictures and in underlined words or phrases. Functionality of icons and underlined words or phrases is usually indicated to a user by the pointer arrow cursor changing to a hand and pointing finger when moved to the immediate vicinity of the icons or underlined words or phrases. The GUI 50 has a section 52 containing product data, a section 54 containing categories of items in the inventory by which items can be searched and from which items can be selected, and a section 56 containing a list of historical shopping lists for each shopper. A drop down menu 58 enables shoppers to select on of a number of shopping functions. A Go button 60 initiates a procedure, for example proceeding to the checkout phase of the virtual shopping trip when the product selections are complete.

The product data is presented in line items for each kind of item located in a search and to be placed in the virtual shopping cart or added to the list in progress. The shopper has the option of activating the Add to Cart icon 86 to place the selected items into the virtual shopping cart, or activating the Add to List icon 88 to add the selected items to the shopping list in progress, or both. In the example, line items 62, 64 and 66 are soda, soup and a loaf of rye bread. Each line item includes a number of columns. Column 70 is for entering a check mark or other symbol to indicate that an item is selected, either from a returned search list or as an having been added to the virtual shopping cart. Column 74 provides a box to insert the quantity of the selected item to be selected or placed into the virtual shopping cart. In line item 64 two cans of soup have been indicated. Column 74 includes the item description, including brand, package size and price per unit. Column 76 provides a total price, helpful where more than one item is indicated. A box 80 can optionally be provided with a running total of all items placed into the virtual shopping cart, or selected from a returned search list.

The categories of items in section 54 are used by the shopper to narrow the scope of a search query.

Section 56 enables shoppers to select any one of a number of historical shopping lists to fill the virtual shopping cart with an initial set of items. A historical shopping list represents items purchased by a shopper during a past shopping session. A historical shopping list is titled with a date and time stamp. The historical shopping list is analogous to a cash register receipt in that it contains items, quantity purchased and price of each item at the time purchased. The shopper may not edit the historical lists. In order to utilize a historical shopping list, the shopper must select the operation to convert a historical shopping list to an active shopping list.

An active shopping list, except for a master shopping list, is named by the shopper and contains items specified by the shopper. Each item has a selection box, quantity and current price, as explained previously. The shopper may load the cart with items in one or more active lists. Each list added to the cart may be the complete list or a selected subset of the list.

The master shopping list is a unique list representation containing all items ever purchased by the shopper. The master shopping list, unlike other active shopping lists, can not be edited by the shopper. The master shopping list is maintained by the system. When a shopper completes a shopping session by making a purchase, those items purchased are added by the system to that shopper's master shopping list.

Figure 3:
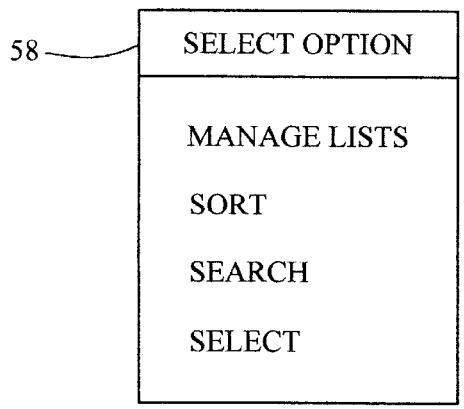
FIG. 3 is a diagram of an exemplary specific embodiment of the pull down menu shown in FIG. 2.
Figure 4:
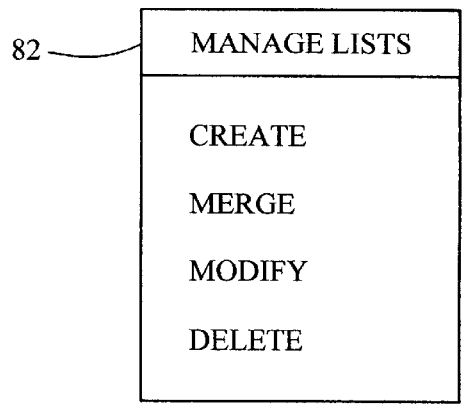
FIG. 4 is a diagram of an exemplary specific embodiment of a nested pull down menu for the manage lists option shown in FIG. 3.

The pull down menu 58 provides for selection of various functions which can be implemented through the GUI. The initial pull down menu can provide for managing lists, sorting, searching and selecting, as shown in FIG. 3. Managing lists, as a submenu 82, can provide for creating, merging, modifying and deleting lists, as shown in FIG. 4. These functions allow shoppers greater list management flexibility. The list managing functions are explained in greater detail.

The shopper can access the Create Named List function via an hyper text markup language HTML page button or icon, for example on the pull down menu 58. Once selected, the shopper is prompted to enter a filename. All checked items will be associated with the newly created file. The shopper presses a Save or Cancel button to finalize the process. In the event of the pre-existence of the filename, the checked contents can be added to the set of items represented by the specified filename. Checked items can represent a set of items currently in the shopping cart or an item or items resulting from an electronic search (e-search) initiated by the shopper.

The process includes finding checked items, getting a filename and storing a named list.

The shopper can access the Merge with Named List function via an HTML button or icon, as explained above. The current list of items will be merged with a named list selected by the user. The shopper selects either the Save or Cancel button to finalize the process. The process includes finding checked items to be merged, displaying shopping list names, getting a list name to be merged with, displaying a selected list contents, getting confirmation from the shopper and merging the list, while checking for duplicates.

The shopper can access the Modify Named List function via an HTML button or icon, as explained above. The shopper is presented with a screen displaying their shopping list names. The shopper selects a shopping list. List items are displayed. The shopper then makes modifications by checkmarking items or removing check-marks from items. The shopper presses either the Save or Cancel button to finalize the process. The process includes displaying a list of named lists, getting the name of a list to be modified, displaying list contents, finding checked items and storing a modified list.

The shopper can access the Delete Named List function via an HTML button or icon, as explained above. The shopper is presented with a screen displaying their shopping list names. Boxes which can be check-marked are displayed next to each named shopping list. The shopper check-marks a box next to the named list or lists to be deleted. The user presses either the Delete or Cancel button to finalize the process. As noted, the master list cannot be deleted. The process includes displaying a list of named lists, finding check-marked named lists to be deleted and deleting one or more named lists.

The shopper can select to shop from two types of lists; historical or active, as explained above.

A further function is to provide a generic search engine so that shoppers can search the inventory data base for specific products by brand name and product type.

It is customary for retail stores to offer specials, that is, products which are offered at discounted, sale prices. Such specials are often unadvertised in the media, and as such, offer an incentive to shop at a particular store if that store has a reputation for offering good specials. Specials can also be made available to on-line shoppers in accordance with the inventive arrangements.

Figure 5:
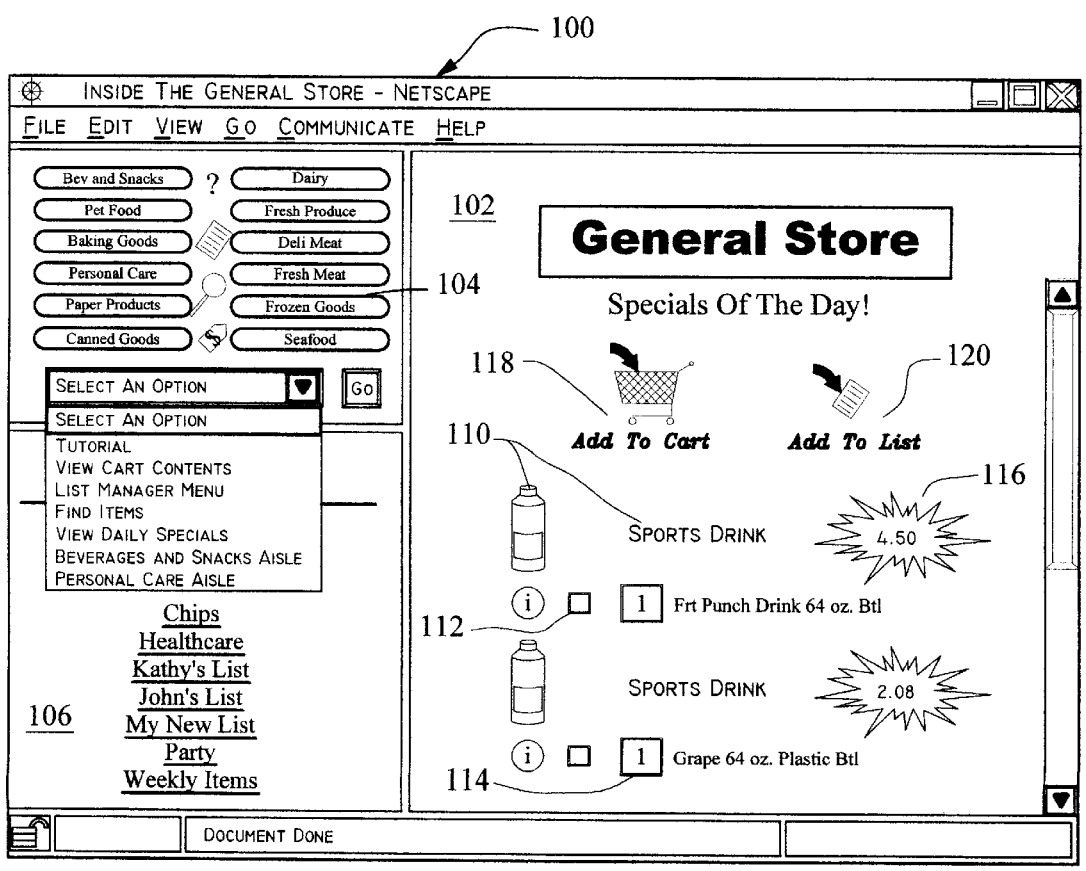
FIG. 5 is an exemplary graphical user interface useful for explaining the integration of store specials and the shopping list builder, and representing in part a more artistic version of the graphical user interface shown in FIG. 1.

With reference to FIG. 5, a GUI 100 is in the form of a window having areas 104, 106 and 108. Area 104 corresponds to area 54 of FIG. 2, and although area 104 is rendered in a different appearance, the function is the same. Similarly, area 106 corresponds to area 56 of FIG. 2, and although the names of the lists are different, the function is the same. Pull down menu 108 is similar to pull down menu 58 shown in FIG. 3. Pull down menu 108 illustrates a different selection of options, but functions the same as pull down menu 58. Area 102 is similar to area 52 of FIG. 2, but instead of showing a shopping list in progress, area 102 shows the specials. In this case, the specials are SportsDrink beverages in different flavors. Each entry can include a picture and a word description of the product, as shown by reference numeral 110. Each product includes a box 112, corresponding to the boxes in column 70 in FIG. 2, which can be marked to indicate that the product is to be added to the cart or to the shopping list. Each product also includes a box 114, corresponding to the boxes in column 72 in FIG. 2, in which the quantity of the product can be entered. Finally, each product includes a price 116. The shopper has the option of activating the Add to Cart icon 118 to place the selected specials into the virtual shopping cart, or activating the Add to List icon 120 to add the selected specials to the shopping list in progress. The icons 118 and 120 correspond to icons 86 and 88 respectively in FIG. 2.

Many different types of stores appear on the Internet today with new ones showing up every day. Many of these stores provide delivery or package orders for pickup as a convenience to the consumer. Clearly, building shopping lists to facilitate shopping in these on-line stores can further enrich the shopping experience.

The key to making this type of service successful is to keep it quick and easy to use, as in accordance with the inventive arrangements taught herein. In fact, the shopping list builder would be useful for shopping any retail business operating over the Internet or offered through any public or private online consumer service.

What is claimed is:

1. A method for engaging in electronic commerce (e-commerce) over a network from an e-commerce site, comprising the steps of:

storing data representing an inventory of items for sale at said e-commerce site;

storing shopping lists of respective shoppers at said e-commerce site;

storing pick lists of respective shoppers at said e-commerce site;

providing logged on shoppers with a shopping list builder tool for constructing entirely new pick lists beginning with no items in said new pick list, and for constructing new pick lists from said stored pick lists by selectively marking items in said stored pick lists for inclusion in said new pick list, each said pick list for use in completing a shopping list and each said pick list stored for defining subsequent pick lists;

accepting completed shopping lists from said logged on shoppers;

consummating purchases of products on said accepted shopping lists; and, delivering said purchased products to said shoppers.

2. The method of claim 1, further comprising the steps of:

storing authorization data enabling shoppers to purchase said items at said e-commerce site on credit; and, authorizing shoppers to purchase said items as said shoppers log on to said e-commerce site.

3. The method of claim 1, further comprising the step of communicating with said shoppers over the Internet.

4. The method of claim 1, further comprising the step of communicating with said shoppers over a wide area network.

5. The method of claim 1, further comprising the step of communicating with said shoppers over the a local area network.

6. The method of claim 1, further comprising the step of communicating with said shoppers over a combination of at least two of the Internet, a wide area network and a local area network.

7. The method of claim 1, further comprising the step of delivering said purchased products to said shoppers at a pickup location.

8. The method of claim 1, further comprising the step of delivering said purchased products to said shoppers at locations selected by said shoppers.

9. The method of claim 1, further comprising the step of enabling said shoppers to use said shopping list builder to create a new pick list.

10. The method of claim 1, further comprising the steps of:

enabling said shoppers to use said shopping list builder to merge pick lists; and, storing said merged pick lists in a new pick list.

11. The method of claim 1, further comprising the step of enabling said shoppers to use said shopping list builder to modify a pick list.

12. The method of claim 1, further comprising the step of enabling said shoppers to use said shopping list builder to delete a pick list.

13. The method of claim 1, further comprising the step of enabling said shoppers to use said shopping list builder to search the inventory data base for specific products by brand name and product type.

14. The method of claim 1, further comprising the steps of:

compiling a cumulative pick list for each shopper;

enabling each shopper to access each shopper's own cumulative pick list; and, preventing shoppers from deleting and modifying said cumulative pick lists.

15. The method of claim 1, further comprising the step of enabling said shoppers to use said shopping list builder to create, merge, modify and delete said pick lists.

16. The method of claim 15, further comprising the step of enabling said shoppers to use said shopping list builder to search the inventory data base for specific products by brand name and product type.

17. The method of claim 16, further comprising the steps of:

compiling a cumulative pick list for each shopper;

enabling each shopper to access each shopper's own cumulative pick list; and, preventing shoppers from deleting and modifying said cumulative pick lists.

18. The method of claim 17, further comprising the step of communicating with said shoppers over at least one of the Internet, a wide area network and a local area network.

19. The method of claim 17, further comprising the step of communicating with said shoppers over a combination of at least two of the Internet, a wide area network and a local area network.

20. The method of claim 1, further comprising the steps of:

displaying lists of product specials; and, enabling said shoppers to select said product specials for addition to a pick list in progress, for addition to a virtual shopping cart, or both.

21. A computer web server programmed with a routine set of instructions for supporting electronic commerce (e-commerce) over a network from an e-commerce site, said computer server comprising:

means for storing data representing an inventory of items for sale at said e-commerce site;

means for storing shopping lists of respective shoppers at said e-commerce site;

means for storing pick lists of respective shoppers at said e-commerce site;

means for providing logged on shoppers with a shopping list builder tool for constructing entirely new pick lists beginning with no items in said new pick list, and for constructing new pick lists from said stored pick lists by selectively marking items in said stored pick lists for inclusion in said new pick list, each said pick list for use in completing a shopping list and each said pick list stored for defining subsequent pick lists;

means for accepting completed shopping lists from said logged on shoppers;

means for consummating purchases of products on said accepted shopping lists; and, means for delivering said purchased products to said shoppers.

22. The computer server of claim 21, further comprising:

means for storing authorization data enabling shoppers to purchase said items at said e-commerce site on credit; and, means for authorizing shoppers to purchase said items as said shoppers log on to said e-commerce site.

23. The computer server of claim 21, further comprising:

means for compiling a cumulative pick list for each shopper;

means for enabling each shopper to access each shopper's own cumulative pick list; and, means for preventing shoppers from deleting and modifying said cumulative pick lists.

24. The computer server of claim 21, wherein said shopping list builder comprises means for enabling said shoppers to use said shopping list builder to create, merge, modify and delete said pick lists.

25. The computer server of claim 21, further comprising means for enabling said shoppers to use said shopping list builder to search the inventory data base for specific products by brand name and product type.

26. The computer server of claim 21, further comprising means for communicating with said shoppers over at least one of the Internet, a wide area network and a local area network.

27. The computer server of claim 1, further comprising:

means for displaying lists of product specials; and, means for enabling said shoppers to select said product specials for addition to a pick list in progress, for addition to a virtual shopping cart, or both.

28. A method for engaging in electronic commerce (e-commerce) over a network from an e-commerce site, comprising the steps of:

storing data representing an inventory of items for sale at said e-commerce site;

storing shopping lists of respective shoppers at said e-commerce site;

storing pick lists of respective shoppers at said e-commerce site;

providing logged on shoppers with a pick list builder tool for populating entirely new pick lists with items from said inventory, and with items from said stored pick lists by selectively marking items in said stored pick lists for inclusion in said new pick list;

providing logged on shoppers with a shopping list builder tool for creating shopping lists from said stored pick lists;

consummating purchases of products on said created shopping lists; and, delivering said purchased products to said shoppers.

* * * * *